US006896084B2

(12) United States Patent
Lo

(10) Patent No.: US 6,896,084 B2
(45) Date of Patent: May 24, 2005

(54) WHEELED VEHICLE HAVING A DETACHABLE REAR FRAME

(76) Inventor: Chiu Hsiang Lo, No. 20, Lane 305, Sec. 3, Jungshan Rd., Tantz Shiag, Taichung Hsien (TW), 427

( * ) Notice: Subject to any disclaimer, the term of this patent is extended or adjusted under 35 U.S.C. 154(b) by 116 days.

(21) Appl. No.: 10/443,786

(22) Filed: May 23, 2003

(65) Prior Publication Data

US 2004/0232638 A1 Nov. 25, 2004

(51) Int. Cl.[7] ................................................ B62D 61/00

(52) U.S. Cl. ....................... 180/208; 180/209; 180/907; 280/767; 280/785

(58) Field of Search ................................ 180/208, 209, 180/210, 216, 908, 907; 280/287, 767, 785, 63, 65

(56) References Cited

U.S. PATENT DOCUMENTS 4,666,008 A * 5/1987 Shepard et al. ............... 180/16
4,683,970 A * 8/1987 Smith .......................... 180/15
4,750,578 A * 6/1988 Brandenfels .................. 180/13
4,892,166 A * 1/1990 Gaffney ....................... 180/208
4,909,525 A * 3/1990 Flowers ....................... 280/30
4,947,955 A * 8/1990 Hopely, Jr. ................. 180/216
5,074,372 A * 12/1991 Schepis ...................... 180/208
5,154,251 A * 10/1992 Fought ....................... 180/208
5,503,243 A * 4/1996 Kruse ......................... 180/208
5,941,327 A * 8/1999 Wu ........................... 180/65.1
6,170,592 B1 * 1/2001 Wu ............................ 180/208
6,273,206 B1 * 8/2001 Bussinger ................... 180/208
6,336,517 B1 * 1/2002 Cheng ........................ 180/208
6,439,331 B1 * 8/2002 Fan ............................ 180/208
6,530,446 B1 * 3/2003 Lin ............................ 180/208
6,655,717 B1 * 12/2003 Wang ......................... 280/781
6,699,616 B2 * 3/2004 Wu ............................. 429/98
6,712,369 B2 * 3/2004 Wu ............................ 280/5.2
6,793,248 B1 * 9/2004 Sung .......................... 280/781

* cited by examiner

*Primary Examiner*—Christopher P. Ellis
*Assistant Examiner*—Brian Swenson
(74) *Attorney, Agent, or Firm*—Charles E. Baxley

(57) ABSTRACT

A wheeled vehicle includes a main frame, and a rear frame detachably mounted on the main frame. The main frame includes a transverse bar and an upright bar. The rear frame includes a crossbar detachably mounted on the transverse bar of the main frame, and a shock-absorber detachably mounted on the upright bar of the main frame. Thus, the rear frame is mounted on and detached from the main frame easily and conveniently, thereby facilitating the user assembling and dismantling the rear frame.

7 Claims, 3 Drawing Sheets

WHEELED VEHICLE HAVING A DETACHABLE REAR FRAME

BACKGROUND OF THE INVENTION

1. Field of the Invention

The present invention relates to a wheeled vehicle for the handicapped people, and more particularly to a wheeled vehicle having a detachable rear frame.

2. Description of the Related Art

A conventional wheeled vehicle for the handicapped people mainly comprises a main frame, a seat, a direction control device, a power source, a shock-absorber, two front wheels, and two rear wheels.

However, the conventional wheeled vehicle has a fixed construction, so that all of the parts of the conventional wheeled vehicle are fixed and cannot be detached from each other, thereby wasting the storage space. In addition, the conventional wheeled vehicle has a fixed construction and cannot be folded, thereby causing inconvenience in transportation of the conventional wheeled vehicle.

SUMMARY OF THE INVENTION

The present invention is to mitigate and/or obviate the disadvantage of the conventional wheeled vehicle.

The primary objective of the present invention is to provide a wheeled vehicle, wherein the rear frame is mounted on and detached from the main frame easily and conveniently, thereby facilitating the user assembling and dismantling the rear frame.

Another objective of the present invention is to provide a wheeled vehicle, wherein the rear frame is detached from the main frame easily and conveniently, thereby facilitating the user folding the rear frame.

A further objective of the present invention is to provide a wheeled vehicle, wherein the rear frame is separated from the main frame, so that they can be laminated together, thereby saving the storage space, and thereby facilitating transportation of the wheeled vehicle.

A further objective of the present invention is to provide a wheeled vehicle, wherein the rear frame is completely separated from the main frame, so that the shock-absorber will not be hit or damaged.

In accordance with the present invention, there is provided a wheeled vehicle, comprising a main frame, and a rear frame, wherein:

the main frame includes a transverse bar and an upright bar;

the rear frame is detachably mounted on the main frame;

the rear frame includes a crossbar detachably mounted on the transverse bar of the main frame; and the rear frame further includes a shock-absorber having a first end secured on the rear frame and a second end detachably mounted on the upright bar of the main frame.

Further benefits and advantages of the present invention will become apparent after a careful reading of the detailed description with appropriate reference to the accompanying drawings.

DETAILED DESCRIPTION OF THE INVENTION

Figure 1:
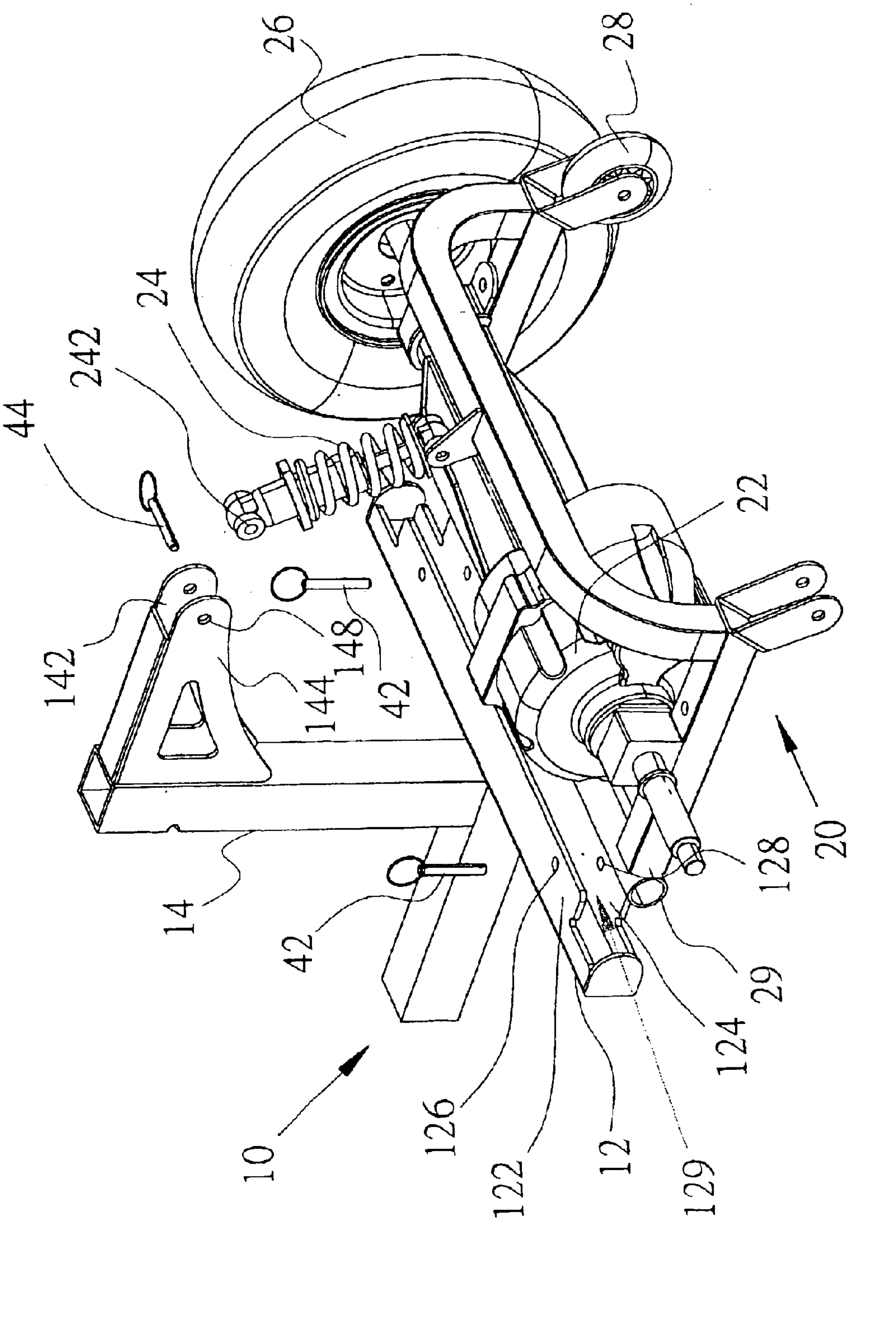
FIG. 1 is a partially exploded perspective view of a wheeled vehicle in accordance with the preferred embodiment of the present invention.
Figure 2:
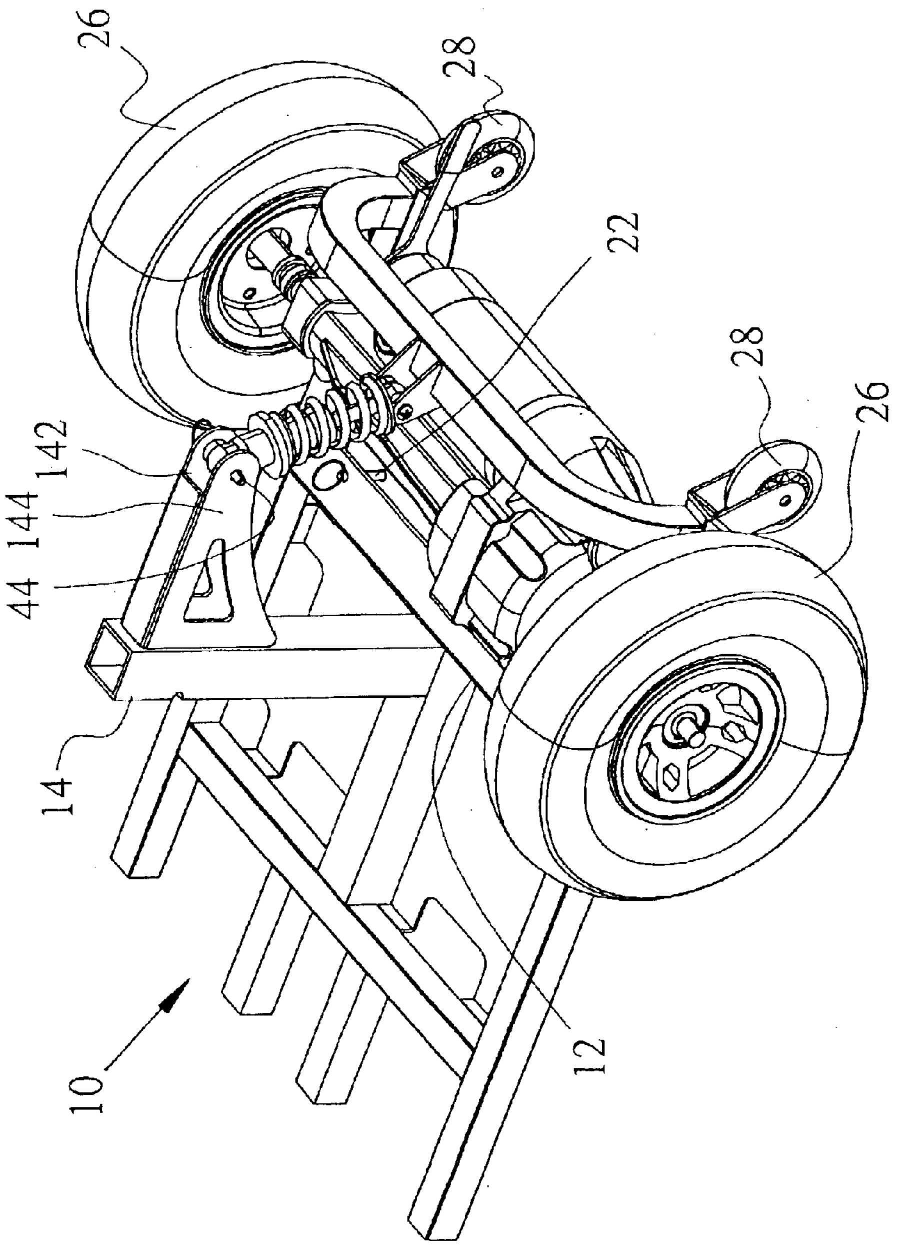
FIG. 2 is a perspective assembly view of the wheeled vehicle in accordance with the preferred embodiment of the present invention.

Referring to the drawings and initially to FIGS. 1 and 2, a wheeled vehicle in accordance with the preferred embodiment of the present invention comprises a main frame 10, and a rear frame 20.

The main frame 10 includes a transverse bar 12 and an upright bar 14.

The transverse bar 12 of the main frame 10 has a substantially U-shaped cross-section. The transverse bar 12 of the main frame 10 has an upper face 122 formed with two spaced through holes 126 and a lower face 124 formed with two spaced through holes 128 aligning with the through holes 126 of the upper face 122. The transverse bar 12 of the main frame 10 has a side wall formed with an opening 129.

The upright bar 14 of the main frame 10 is mounted on the transverse bar 12 of the main frame 10 and is substantially inverted L-shaped. The upright bar 14 of the main frame 10 is provided with two side walls 144 each formed with a through hole 148 and a mounting space 142 defined between the two side walls 144.

The rear frame 20 is detachably mounted on the main frame 10.

The rear frame 20 includes a crossbar 29 detachably mounted on the transverse bar 12 of the main frame 10. The wheeled vehicle further comprises two insertion pins 42 each extended through the respective through hole 126 of the upper face 122 of the transverse bar 12 of the main frame 10, the crossbar 29 of the rear frame 20, and the respective through hole 128 of the lower face 124 of the transverse bar 12 of the main frame 10, so that the crossbar 29 of the rear frame 20 is fixed in the transverse bar 12 of the main frame 10, and the rear frame 20 is combined with the main frame 10.

The rear frame 20 further includes two rear wheels 26, two auxiliary wheels 28, a power source 22 for supplying a power to rotate the two rear wheels 26, and a shock-absorber 24 connected to the upright bar 14 of the main frame 10. The shock-absorber 24 of the rear frame 20 has a first end secured on the rear frame 20 and a second end pivotally mounted in the mounting space 142 between the two side walls 144 of the upright bar 14 of the main frame 10. The second end of the shock-absorber 24 of the rear frame 20 is formed with a through hole 242 aligning with the through hole 148 of each of the two side walls 144 of the upright bar 14 of the main frame 10. The wheeled vehicle further comprises an insertion pin 44 extended through the through hole 148 of each of the two side walls 144 of the upright bar 14 of the main frame 10 and the through hole 242 of the shock-absorber 24 of the rear frame 20, so that the shock-absorber 24 of the rear frame 20 is combined with the upright bar 14 of the main frame 10.

Figure 3:
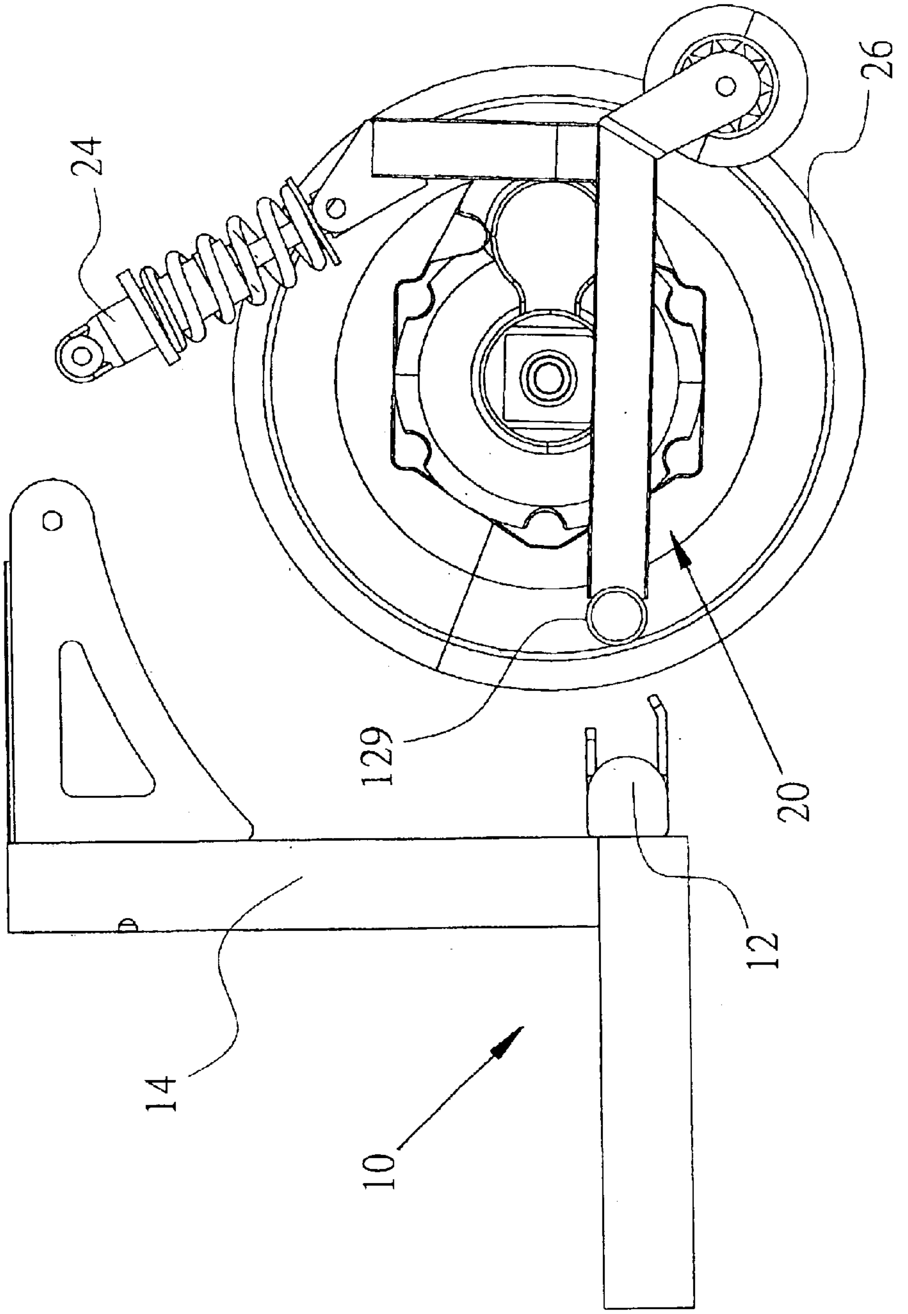
FIG. 3 is a side plan exploded view of the wheeled vehicle as shown in FIG. 2.

Referring to FIG. 3 with reference to FIGS. 1 and 2, the insertion pins 42 and 44 are removed outward to detach the crossbar 29 of the rear frame 20 from the transverse bar 12 of the main frame 10, and to detach the shock-absorber 24 of the rear frame 20 from the upright bar 14 of the main frame 10, so that the rear frame 20 is detached from the main frame 10 as shown in FIG. 3.

Accordingly, the rear frame 20 is mounted on and detached from the main frame 10 easily and conveniently, thereby facilitating the user assembling and dismantling the rear frame 20. In addition, the rear frame 20 is detached from the main frame 10 easily and conveniently, thereby facilitating the user folding the rear frame 20. Further, the rear frame 20 is separated from the main frame 10, so that they can be laminated together, thereby saving the storage space, and thereby facilitating transportation of the wheeled vehicle. Further, the rear frame 20 is completely separated from the main frame 10, so that the shock-absorber 24 will not be hit or damaged.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wheeled vehicle, comprising a main frame, and a rear frame, wherein:

the main frame includes a transverse bar and an upright bar;

the transverse bar of the main frame has an upper face formed with two spaced through holes an a lower face formed with two spaced through holes aligning with the through holes of the upper face;

the rear frame is detachably mounted on the main frame;

the rear frame includes a crossbar detachably mounted on the transverse bar of the main frame;

the rear frame further includes a shock-absorber having a first end secured on the rear frame and a second end detachably mounted on the upright bar of the main frame;

the wheeled vehicle further comprises two insertion pins each extending through the respective through hole of the upper face of the transverse bar of the main frame, passing by the crossbar of the rear frame, and extending through the respective through hole of the lower face of the transverse bar of the main frame, so that the crossbar of the rear frame is fixed on the transverse bar of the main frame by the insertion pins;

the two insertion pins fix a position of the crossbar of the rear frame relative to the main frame by closing off an open end of the transverse bar of the main frame preventing removal of the crossbar of the rear frame.

2. The wheeled vehicle in accordance with claim 1, wherein the transverse bar of the main frame has a substantially U-shaped cross-section.

3. The wheeled vehicle in accordance with claim 1, wherein the transverse bar of the main frame has a side wall formed with an opening.

4. The wheeled vehicle in accordance with claim 1, wherein the upright bar of the main frame is mounted next to the transverse bar of the main frame.

5. The wheeled vehicle in accordance with claim 1, wherein the upright bar of the main frame is substantially inverted L-shaped.

6. The wheeled vehicle in accordance with claim 1, wherein the upright bar of the main frame is provided with two side walls and a mounting space defined between the two side walls, and the second end of shock-absorber is pivotally mounted in the mounting space between the two side walls of the upright bar of the main frame.

7. The wheeled vehicle in accordance with claim 6, wherein each of the two side walls of the upright bar of the main frame is formed with a through hole, the second end of the shock-absorber of the rear frame is formed with a through hole aligning with the through hole of each of the two side walls of the upright bar, and the wheeled vehicle further comprises an insertion pin extended through the through hole of each of the two side walls of the upright bar of the main frame and the through hole of the shock-absorber of the rear frame, such that the shock-absorber of the rear frame is combined with the upright bar of the main frame.

* * * * *